(12) United States Patent
Hong

(10) Patent No.: US 7,683,272 B2
(45) Date of Patent: Mar. 23, 2010

(54) INFANT HEIGHT AND WEIGHT MEASURING SCALE WITH FOLDABLE AND EXTENDABLE SUPPORTING PANELS

(76) Inventor: Chuan Hong, Room 402, No. 25 Building, 1288 Lane, Pujian Road, Pudong District, Shanghai (CN) 201204

( * ) Notice: Subject to any disclaimer, the term of this patent is extended or adjusted under 35 U.S.C. 154(b) by 0 days.

(21) Appl. No.: 12/176,350

(22) Filed: Jul. 19, 2008

(65) Prior Publication Data

US 2008/0277169 A1 Nov. 13, 2008

Related U.S. Application Data

(63) Continuation of application No. PCT/CN2006/002564, filed on Sep. 29, 2006.

(30) Foreign Application Priority Data

| Jan. 24, 2006 | (CN) | ......................... 2006 2 0039169 |
| Sep. 29, 2006 | (CN) | ......................... 2006 2 004646 |

(51) Int. Cl.
   *G01G 21/22* (2006.01)
(52) U.S. Cl. ....................... 177/126; 177/262
(58) Field of Classification Search ................. 177/126, 177/127, 262
   See application file for complete search history.

(56) References Cited

U.S. PATENT DOCUMENTS

| 1,371,281 | A | * | 3/1921 | Weber | ........................ 33/512 |
| 2,210,399 | A | * | 8/1940 | Ericksen | ..................... 177/126 |
| 2,931,640 | A | * | 4/1960 | Riddle, Jr. | .................... 177/262 |
| 4,711,313 | A | * | 12/1987 | Iida et al. | ..................... 177/127 |
| 5,065,830 | A | * | 11/1991 | Stevenson | .................... 177/263 |
| 5,414,225 | A | * | 5/1995 | Garfinkle | ..................... 177/199 |
| 5,434,367 | A | * | 7/1995 | Salini | ......................... 177/189 |
| 5,496,972 | A | * | 3/1996 | Demar et al. | ............... 177/126 |
| 5,994,649 | A | * | 11/1999 | Garfinkle et al. | ......... 177/25.11 |
| 6,256,896 | B1 | * | 7/2001 | Landauer | ..................... 33/512 |
| 6,337,446 | B1 | * | 1/2002 | Hulburt et al. | ............. 177/126 |
| 6,441,323 | B1 | * | 8/2002 | Montagnino et al. | ........ 177/126 |
| 6,998,543 | B2 | * | 2/2006 | Sugrue et al. | ............... 177/126 |
| 7,199,311 | B1 | * | 4/2007 | Buckner et al. | ............. 177/144 |
| 7,442,885 | B2 | * | 10/2008 | Hsu | .......................... 177/126 |
| 2002/0129978 | A1 | * | 9/2002 | Montagnino et al. | ........ 177/126 |
| 2005/0061556 | A1 | * | 3/2005 | Sugrue et al. | ............... 177/262 |

FOREIGN PATENT DOCUMENTS

FR   2675255 A1 * 10/1992

* cited by examiner

*Primary Examiner*—Randy W Gibson
(74) *Attorney, Agent, or Firm*—Matthias Scholl P.C.; Matthias Scholl

(57) ABSTRACT

A scale, comprising a body, wherein a supporting panel is disposed on the body; the supporting panel comprises an upper supporting panel and a lower supporting panel that can be folded and unfolded; the lower supporting panel is connected to the body via a rotatable axis disposed on a off-center position of the body, or a pair of slideways. The scale according to the invention is able to safely and effectively measure height and weight in a horizontal state, and the small size thereof is particularly useful in households. The scale is applicable to measuring the weight and height of infants, children, and adults.

13 Claims, 10 Drawing Sheets

US 7,683,272 B2

INFANT HEIGHT AND WEIGHT MEASURING SCALE WITH FOLDABLE AND EXTENDABLE SUPPORTING PANELS

CROSS-REFERENCE TO RELATED APPLICATIONS

This application in a continuation of International Patent Application No. PCT/CN2006/002564, with an international filing date of Sep. 29, 2006, designating the United States, now pending, and claims priority benefits to Chinese Patent Application No. 200620039169.9 filed Jan. 24, 2006 and Chinese Patent Application No. 200620046461.3 filed Sep. 29, 2006. The contents of all of these applications, including any intervening amendments thereto, are incorporated herein by reference.

BACKGROUND OF THE INVENTION

1. Field of the Invention

The invention relates to a scale, and more particularly to a height and weight measuring scale for infants.

2. Description of the Related Art

Monitoring of weight gain and length gain of infants is important to healthy development and disease prevention. Conventional instruments for measuring weight and height are divided into the following categories:

1. Sleeping-posture measuring instruments. These use a large pan to measure weight, and do not measure height. They are suitable for use with infants. However, because of their large size and heavy weight, they are not suitable for private use in households. In addition, their safety is also not fully satisfactory.

2. Sitting-posture or standing-posture measuring instrument. These use a weighing scale to measure weight and different sliders to measure height. They are suitable for adults. However, they are only suitable for measuring height and weight in professional settings, and are unable to safely and effectively measure the height and weight of infants.

Accordingly, much opportunity for improvement in this field remains.

SUMMARY OF THE INVENTION

In view of the above-described problems, it is one objective of the invention to provide a scale capable of measuring weight and height of infants incapable of standing up and children and adults that can stand up, the scale having a small size and low cost, and being suitable for home use.

To achieve the above objectives, in accordance with one embodiment of the invention, provided is a scale, comprising a body, wherein a supporting panel is disposed on the body; the supporting panel comprises an upper supporting panel and a lower supporting panel that can be folded and unfolded. The lower supporting panel is connected to the body via a rotatable axis disposed in an off-center position of the body.

In certain classes of this embodiment, the supporting panel is an extendable structure.

In certain classes of this embodiment, a part of the body contacted with the supporting panel is square, and the rotatable axis is disposed at ¼ length of the line segment of an axis of symmetry of the body which segment is contacting with the supporting panel.

In certain classes of this embodiment, a standard plate is disposed on the end of the support panel supporting a head of an infant if the supporting panel is unfolded, a slider capable of sliding along a vertical direction of the supporting panel is disposed on the other end of the supporting panel supporting feet of an infant if the supporting panel is unfolded, and scale is vertically marked on the surface of the supporting panel.

In certain classes of this embodiment, a height measure is vertically disposed on the body.

To achieve the above objectives, in accordance with another embodiment of the invention, provided is a weighing scale, comprising a body, wherein a supporting panel is disposed on the body; the supporting panel comprises an upper supporting panel and a lower supporting panel that can be folded and unfolded; and the lower supporting panel is connected to the body via a pair of slideways.

In certain classes of this embodiment, the supporting panel is an extendable structure.

In certain classes of this embodiment, a standard plate is disposed on the end of the support panel supporting a head of an infant if the supporting panel is unfolded, a slider capable of sliding along a vertical direction of the supporting panel is disposed on the other end of the supporting panel supporting feet of an infant if the supporting panel is unfolded, and scale is vertically marked on the surface of the supporting panel.

In certain classes of this embodiment, a height measure is vertically disposed on the body.

The invention is capable of conveniently and accurately measuring length and weight of infants in a horizontal state, and the small size thereof is particularly applicable to its use in household settings. As infants grow up and are able to stand up, they do not outgrow the scale, and thus, waste is prevented.

BRIEF DESCRIPTION OF THE DRAWINGS

The invention is described hereinbelow with reference to accompanying drawings, in which.

Legend: 1. body; 2. upper supporting panel; 3. lower supporting panel; 4. installation position for a height measure; 51. rotatable axis; 52. slideway; 6. soft headrest; 7. protruding portion; 8. footrest; 9. standard plate; 10. slider; 11. extending plate; 12. column; 13. height measure.

DETAILED DESCRIPTION OF THE INVENTION

Figure 1:
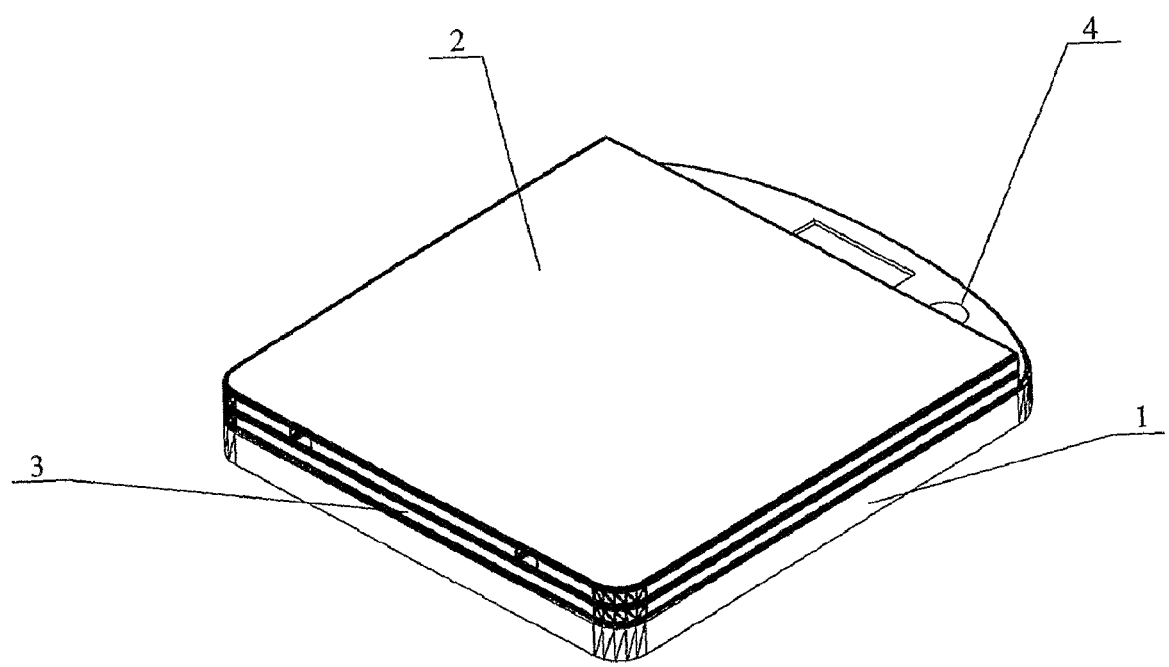
FIG. 1 is a perspective view of a weighing scale according to one embodiment of the invention.

As shown in FIG. 1, a weighing scale of the invention comprises a body 1 and a supporting panel 2, 3 disposed on the body 1. The supporting panel 2, 3 comprises an upper supporting panel 2 and a lower supporting panel 3 that can be folded and unfolded. The upper supporting panel 2 and the lower supporting panel 3 can be connected altogether via an articulated flap. If a standing child or an adult is to measure weight, he/she may stand on the folded supporting panels, and the body 1 will display weight on an LCD display.

Figure 2:
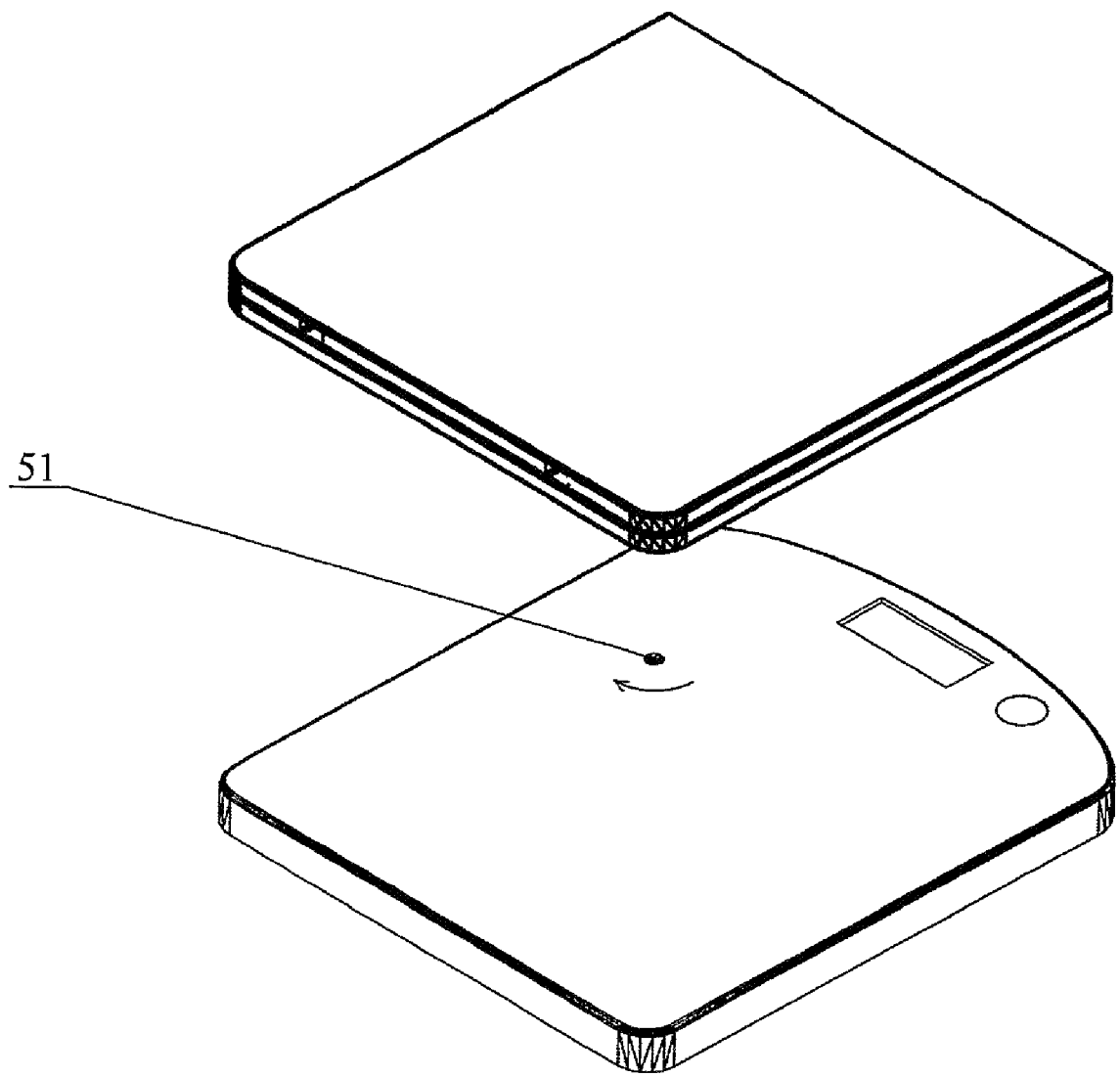
FIG. 2 shows a body of the weighing scale according to one embodiment of the invention detached from a supporting panel employing a rotatable structure.

If an infant incapable of standing up is to be measured, the supporting panel needs to be unfolded. To implement this, a rotatable structure is employed as shown in FIG. 2. A part of the body 1 contacted with the supporting panel is square, and the lower supporting plate 3 is connected to the body 1 via a rotatable axis 51 disposed in an off-center position of the body contacted with the supporting panel. The rotatable axis 51 is disposed at a position that is ¼ of a distance on a diagonal between two corners of the body 1. The number of axis of symmetry of the body 1 contacting with the supporting panel is 4, comprising a pair of diagonal lines and a pair of lines perpendicular to a side. The line segment of the axis of symmetry is a line segment between two opposite sides of the square on the diagonal lines and the lines perpendicular to a side.

Figure 4:
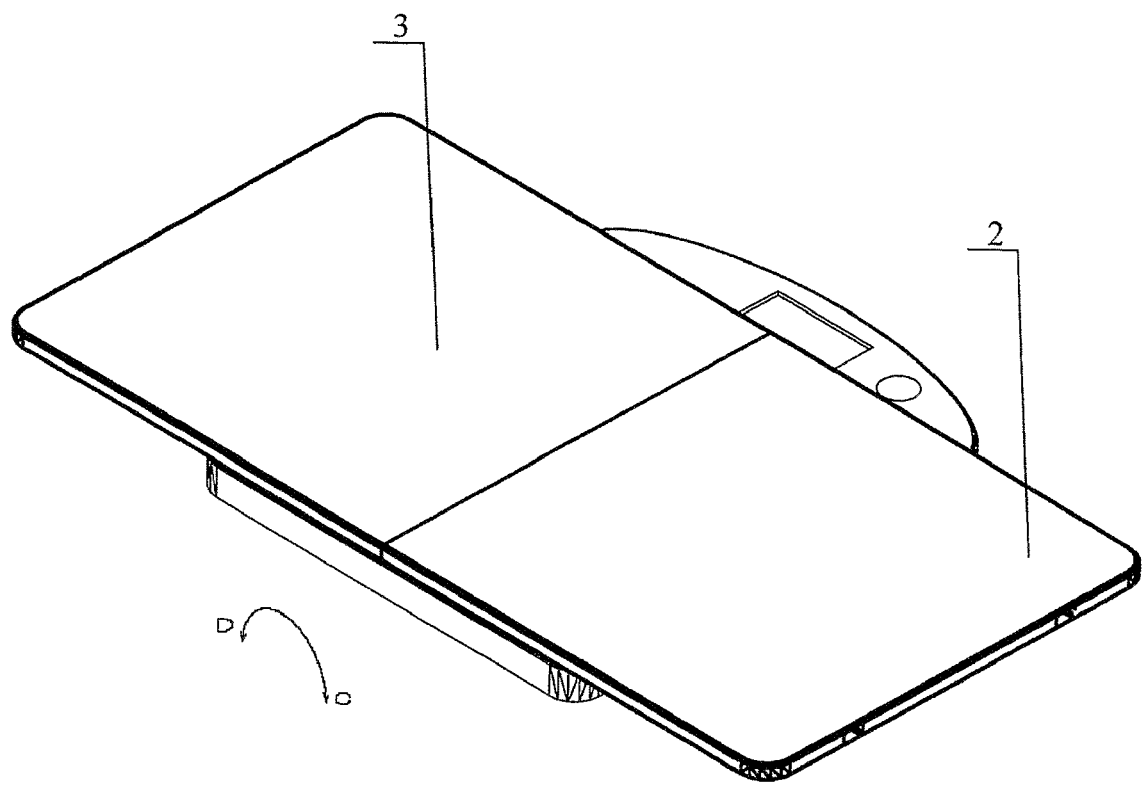
FIG. 4 is shows an unfolded supporting panel according to one embodiment of the invention.

As the supporting panel rotates around the rotatable axis 51, the upper supporting panel and the lower supporting panel folded altogether are unfolded, and a gravity center of the unfolded supporting panel becomes a center of the body 1. For example, in FIG. 2, the rotatable axis 51 is disposed at ¼ length of a diagonal line of the body toward the left corner. The lower supporting panel 3 is capable of rotating 90 degrees around the rotatable axis 51, and the upper supporting panel 2 is unfolded along a direction indicated by the arrow labeled CD in FIG. 4, so that the entire supporting panel is located at the top of the body after being unfolded. Thus, the small-size weighing scale has enough space for infants incapable of standing up to lie thereon. If the rotatable axis 51 is disposed at ¼ length of the line segment of an axis of symmetry perpendicular to one side, the supporting panel needs to rotate 180 degrees around the rotatable axis 51 before being unfolded.

Figure 3:
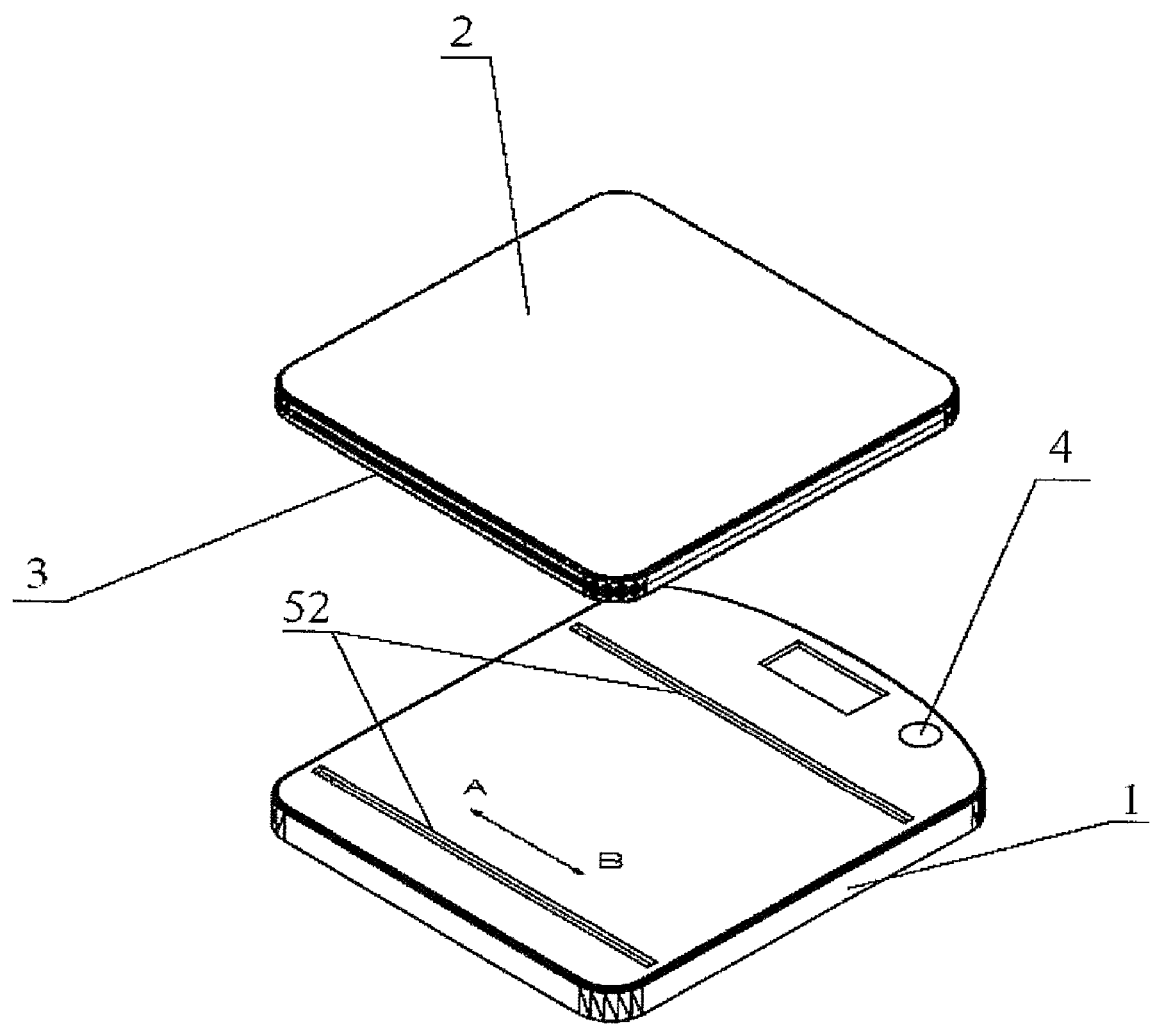
FIG. 3 shows a body of a weighing scale according to another embodiment of the invention detached from a supporting panel employing a sliding structure.

To measure weight of infants incapable of standing up, another sliding structure for unfolding the supporting panel is used. As shown in FIG. 3, the lower supporting panel 3 is connected to the body 1 via a pair of slideways 52. The supporting panel is capable of moving back and forth on the slideways 52, as indicated by an arrow AB in FIG. 3. If the supporting panel is to be unfolded, the supporting panel is moved to the back of one side of the body 1, and the upper supporting panel is opened as indicated by an arrow CD in FIG. 4, thus the supporting panels cover the body for measuring weight of infants thereon.

Figure 5:
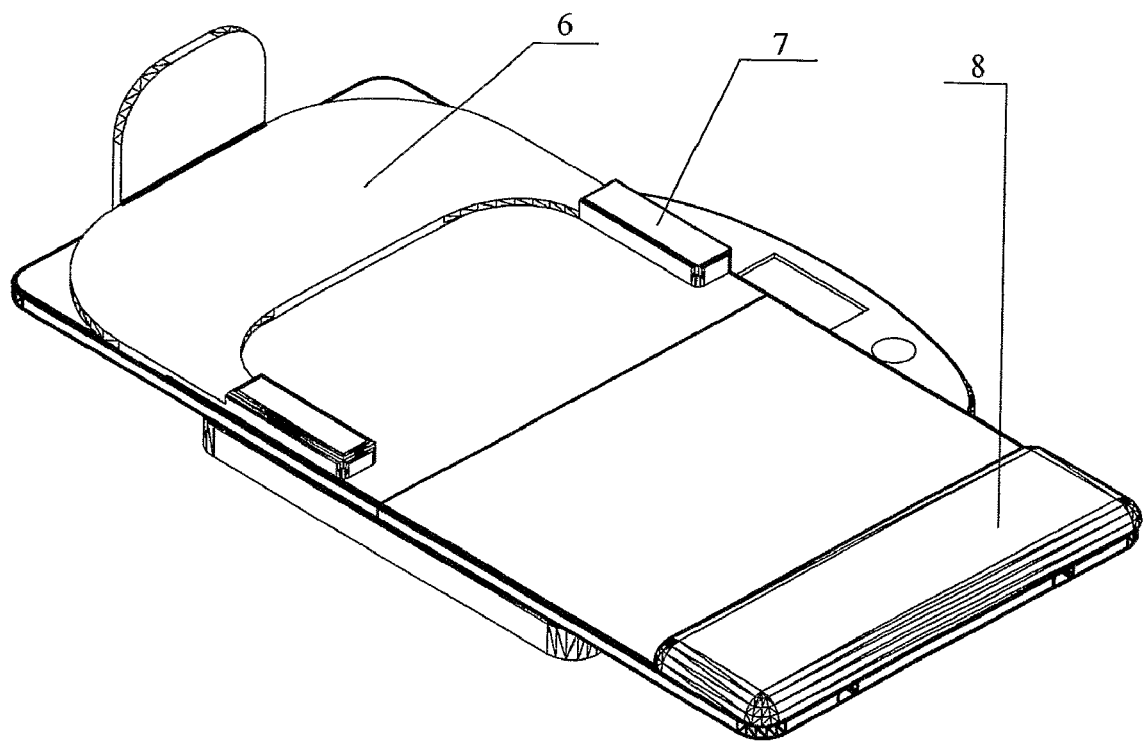
FIG. 5 shows a soft headrest and a footrest according to one embodiment of the invention.

As shown in FIG. 5, to take measurement more accurately and for measured infants to feel more comfortable, a soft headrest 6 is disposed on one end of the supporting panel supporting a head of an infant if the supporting panel is unfolded. Sometimes arms of an infant may touch the supporting plane, and the accuracy of measurement is affected. A protruding portion 7 is disposed on each side of the supporting panel supporting an elbow of an infant if the supporting panel is unfolded, and the infant may put his arms on the protruding portion 7 so as to prevent them from falling to the ground. A footrest 8 is disposed on the other end of the supporting panel supporting feet of an infant if said supporting panel is unfolded, so as to elevate the feet of the infant, and to prevent the feet of the infant from touching the ground and affecting accuracy of the measurement.

Figure 6:
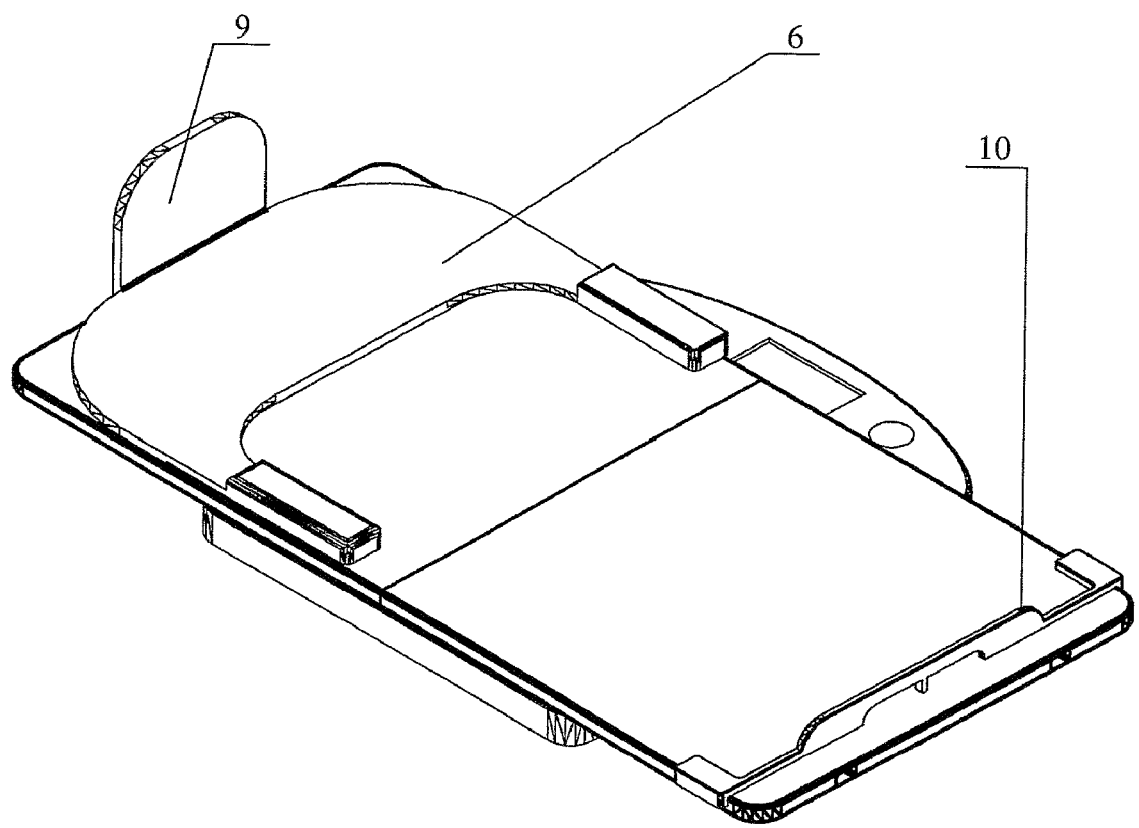
FIG. 6 is a schematic diagram of measuring height of infants via a weighing scale according to one embodiment of the invention.

For measuring the length of an infant, as shown in FIG. 6, a standard plate 9 is disposed on the end of the unfolded support panel supporting a head of the infant, and the head of the infant is made to abut against the standard plate 9. A slider 10 capable of sliding along a vertical direction of the supporting panel is disposed on the other end of the unfolded supporting panel supporting feet of an infant, and scale is vertically marked on the surface of the supporting panel. The slider 10 is moved to the feet of the infant, and length of the infant can be obtained via the scale on the supporting panel. For easy installation and use, the soft headrest 6, the protruding portion 7 and the standard plate 9 can be combined into one piece.

Figure 7:
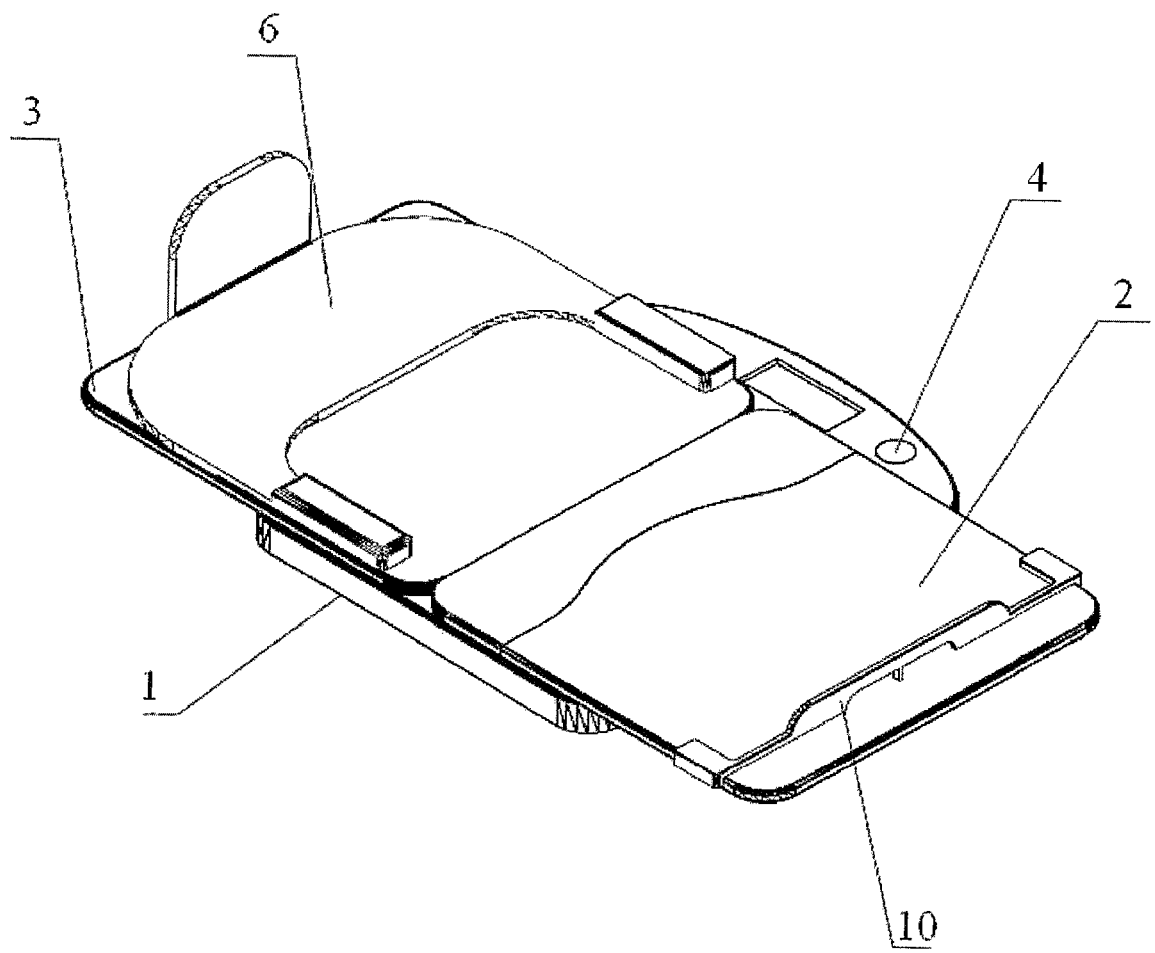
FIGS. 7 and 8 illustrate extendable supporting panel according to one embodiment of the invention.
Figure 8:
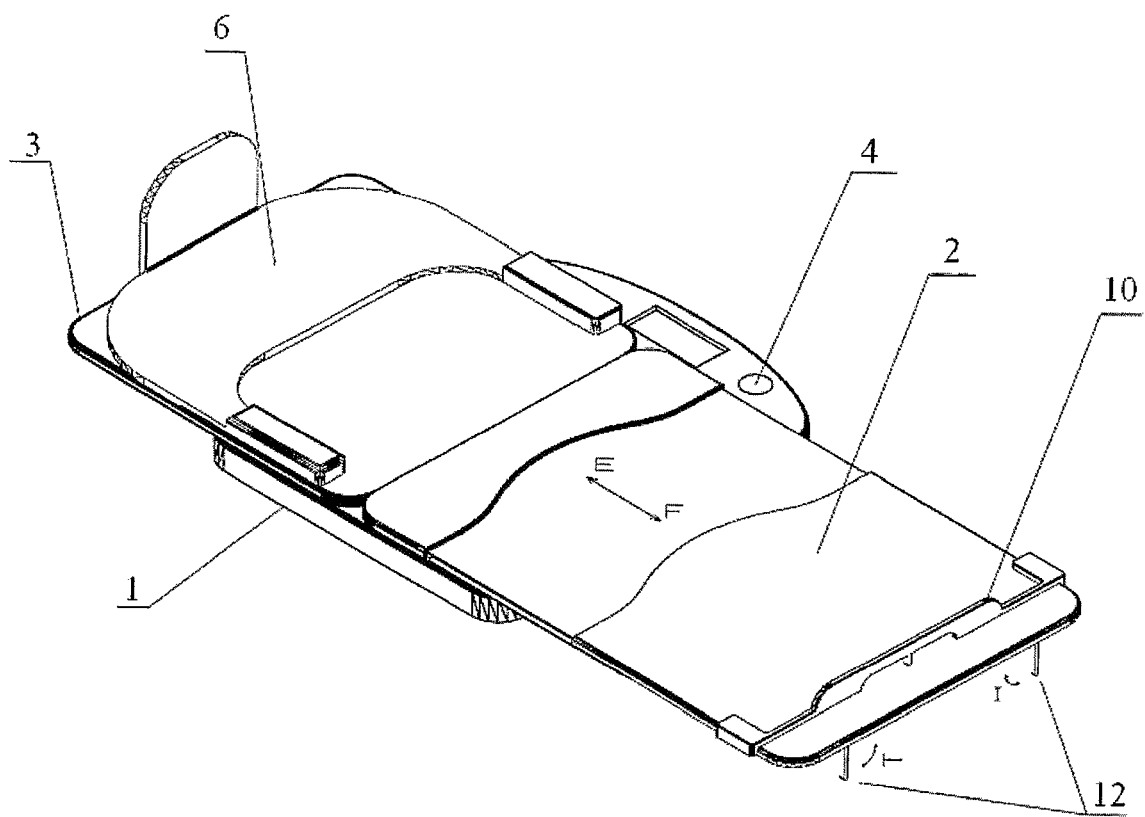
Figure 9:
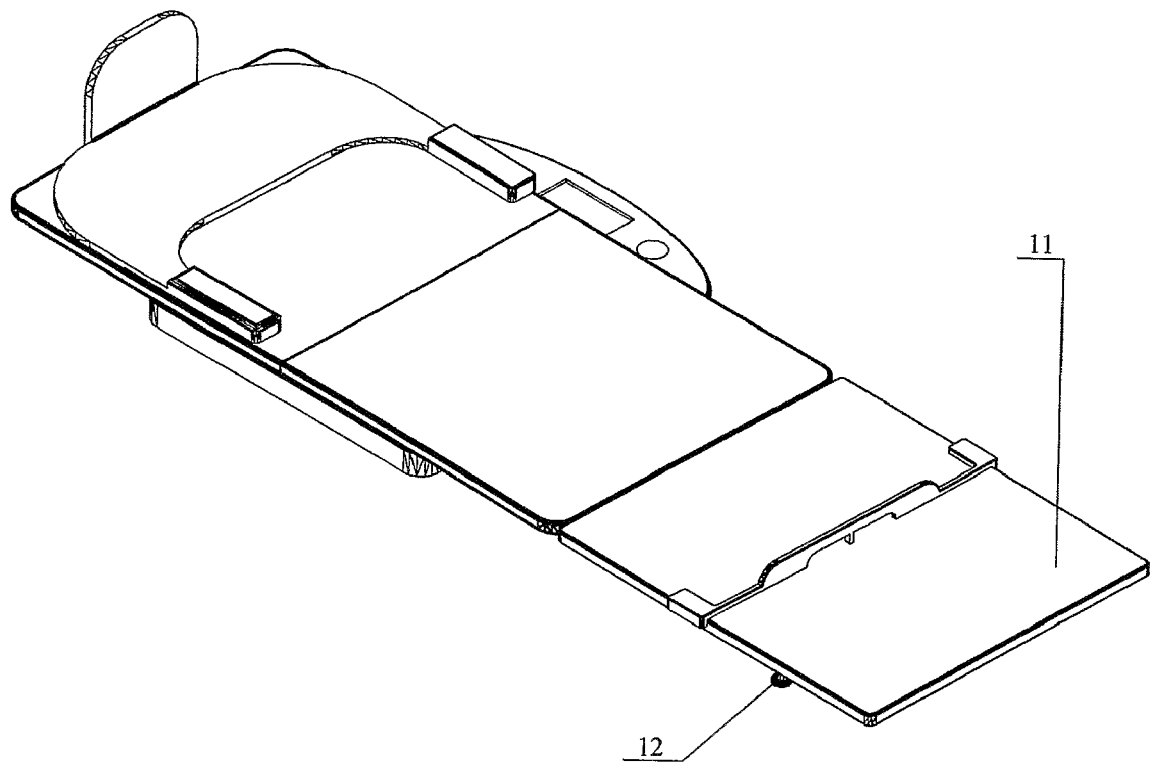
FIG. 9 shows a weighing scale with an extending plate according to one embodiment of the invention.

If an infant is comparatively tall, the supporting panel of the invention may employ an extendable structure. A folded state is shown in FIG. 7, and an unfolded state is shown in FIG. 8. The supporting panel is capable of extending along the direction indicated by the arrow EF in FIG. 8. A standard plate 9 is disposed on the end of the unfolded support panel supporting a head of the infant. A slider 10 capable of sliding along a vertical direction of the supporting panel is disposed on the other end of the unfolded supporting panel supporting feet of the infant. The scale is vertically marked on the surface of the supporting panel, and another scale is continuously marked on the upper surface of an extending portion of the supporting panel. For example, if a maximum scale value of the slider as the supporting panel does not extend is 60 cm, after the supporting panel extends, the scale value gradually increases from 60 cm. As the supporting panel fully extends, the length measuring scale on the supporting panel is obtained via the slider. The height of the infant is the length of the scale plus the extended length of the supporting panel.

As shown in FIG. 8, a column 12 is disposed at the bottom of a side of the unfolded supporting panel opposite to the body, and operates to keep level the supporting panel when measuring the height of infants.

For measuring the weight of a comparatively tall infant, the extendable structure can be extended. For accurate measurement, the retractable column 12 can be retracted along a direction of an arrow H or I, so as to guarantee accuracy of measuring data.

If an infant is comparatively tall, the invention may employ another structure, namely an extending plate 11 disposed on the end of the supporting panel supporting feet of the infant, as shown in FIG. 11. The scale is vertically and continuously marked on the extending plate. A slider capable of sliding along a vertical direction of the supporting panel is disposed on the supporting panel and the extending plate, so as to measure the height of the infant. Moreover, a column 12 for aligning the extending plate with the supporting panel is disposed at the bottom of the extending plate 11.

Figure 10:
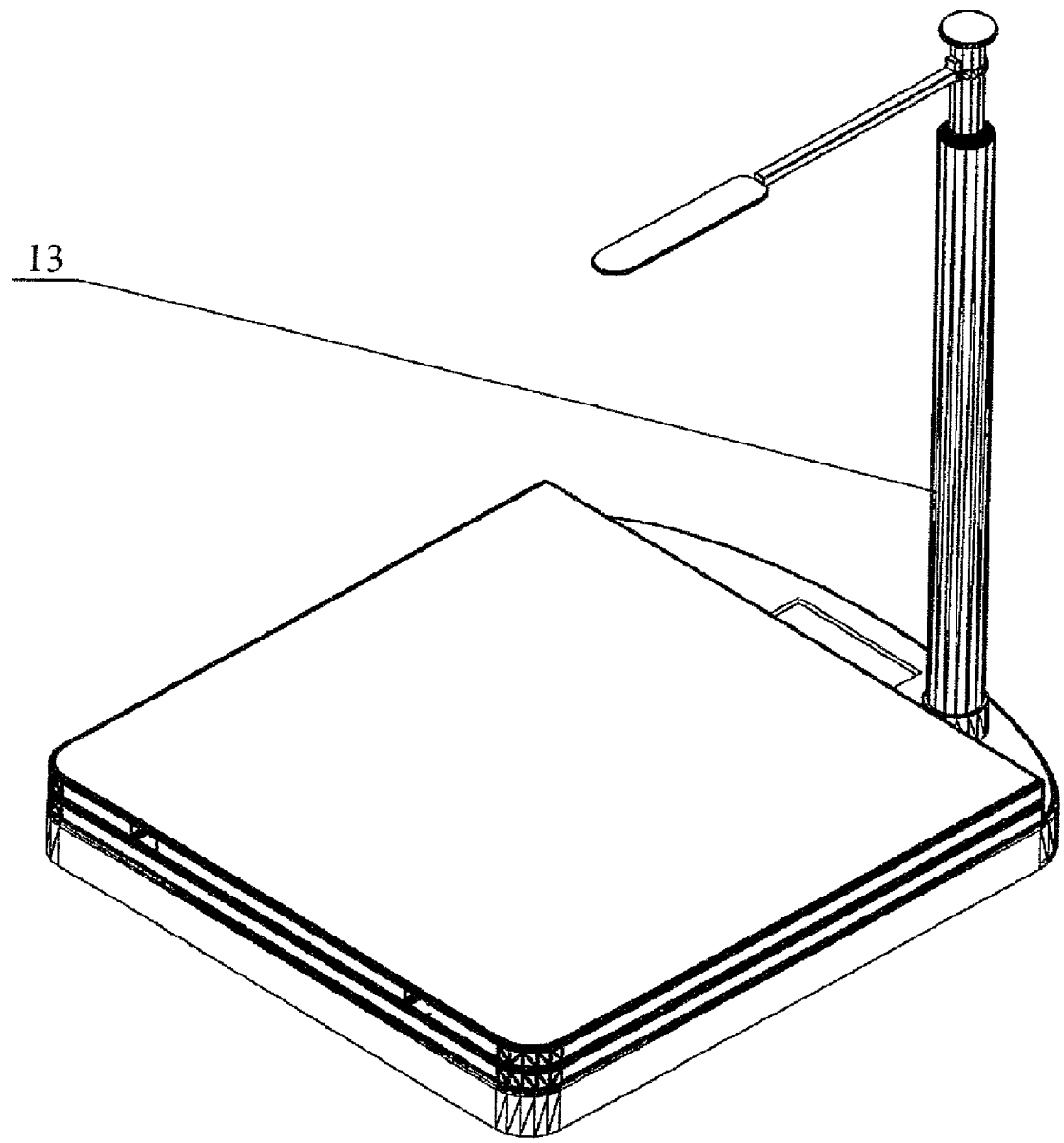
FIG. 10 shows a weighing scale with a height measure according to one embodiment of the invention.

In addition, if the height of children and adults capable of standing up is to be measured, an installation position for a height measure 4 is disposed on the body, and a height measure 13 is disposed therein, as shown in FIGS. 7 and 10. By utilizing the height measure 4, it is possible to measure height of children and adults capable of standing up. The height measure is an extendable structure, which saves layout space to a maximum. The soft headrest 6, the protruding portion 7, the footrest 8, the standard plate 9, the slider 10, the extending plate 11 and the height measure 13 are removable, which makes the weighing scale small in size and easy to use.

INDUSTRIAL APPLICABILITY

Existent weighing scales comprise professional large size scales for measuring weight and height of infants and scales designed for people capable of standing up. However, and small size scales for measuring height and weight of infants incapable of standing up and height and weight of children and adults capable of standing up do not exist. An objective of the invention is to provide such scales. A folded/unfolded structure of the supporting panel enables the weighing scale to be widely used by different kinds of people. Manufacturing of products according to the invention has started, and the invention is applicable for industrial production.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

All publications and patent applications mentioned in this specification are indicative of the level of skill of those skilled in the art to which this invention pertains. All publications and patent applications mentioned in this specification are herein incorporated by reference to the same extent as if each individual publication or patent application mentioned in this specification was specifically and individually indicated to be incorporated by reference.

What is claimed is:

1. A scale, comprising:
    a body having a rotatable axis disposed on a off-center position; and
    a supporting panel comprising an upper supporting panel and a lower supporting panel;
    wherein
    said supporting panel is disposed on said body;
    said upper supporting panel and said lower supporting panel are foldable;
    said lower supporting panel is connected to said body via said rotatable axis;
    a first end of said supporting panel is for supporting the head of an infant when said supporting panel is unfolded;
    a soft headrest is disposed on the end of said supporting panel; and
    a standard plate is disposed on the end of said support panel.

2. The scale of claim 1, wherein
    both sides of said supporting panel are for supporting elbows of an infant if said supporting panel is unfolded; and
    a protruding portion is disposed on each side of said supporting panel.

3. The scale of claim 2, wherein
    a second end of said supporting panel supports feet of an infant when said supporting panel is unfolded; and
    a footrest is disposed on the other end of said supporting panel.

4. The scale of claim 3, wherein
    a slider capable of sliding along a vertical direction of said supporting panel is disposed on said second end of said supporting panel; and
    scale is vertically marked on the surface of said supporting panel.

5. The scale of claim 3, wherein
    an extending plate is disposed on the other end of said supporting panel;
    the scale is vertically and continuously marked on said extending plate and said supporting panel; and
    a slider capable of sliding along a vertical direction of said supporting panel is disposed on said supporting panel and said extending plate.

6. The scale of claim 5, wherein a column for aligning said extending plate with said supporting panel is disposed at the bottom of said extending plate.

7. The scale of claim 6, wherein
    a column is disposed at the bottom of a side of said supporting panel opposite to said body when said supporting panel is unfolded; and
    a height measure is vertically disposed on said body.

8. A scale, comprising:
    a body; and
    a supporting panel comprising a pair of slideways, an upper supporting panel and a lower supporting panel;
    wherein
    said supporting panel is disposed on said body;
    said upper supporting panel and said lower supporting panel are foldable;
    said lower supporting panel is connected to said body via said slideways;
    a first end of said supporting panel is for supporting the head of an infant when said supporting panel is unfolded;
    a soft headrest is disposed on the end of said supporting panel; and
    a standard plate is disposed on the end of said support panel.

9. The scale of claim 8, wherein
    both sides of said supporting panel are for supporting elbows of an infant if said supporting panel is unfolded; and
    a protruding portion is disposed on each side of said supporting panel.

10. The scale of claim 9, wherein
    a second end of said supporting panel supports feet of an infant when said supporting panel is unfolded; and
    a footrest is disposed on the other end of said supporting panel.

11. The scale of claim 10, wherein
    a slider capable of sliding along a vertical direction of said supporting panel is disposed on said second end of said supporting panel; and
    scale is vertically marked on the surface of said supporting panel.

12. The scale of claim 10, wherein
    an extending plate is disposed on the other end of said supporting panel;
    the scale is vertically and continuously marked on said extending plate and said supporting panel; and
    a slider capable of sliding along a vertical direction of said supporting panel is disposed on said supporting panel and said extending plate.

13. The scale of claim 12, wherein a column for aligning said extending plate with said supporting panel is disposed at the bottom of said extending plate.

* * * * *